J. Tracy,
Hanging Saws,
No 51,244.   Patented Nov. 28, 1865.
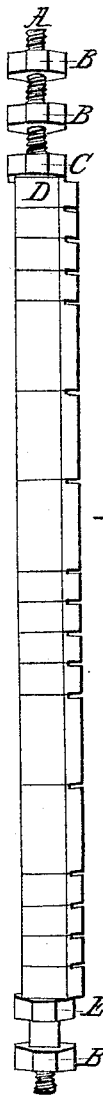
Fig. 1.
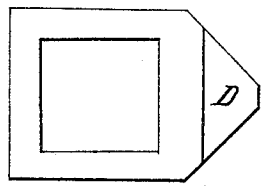
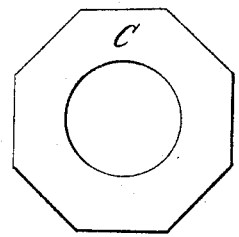
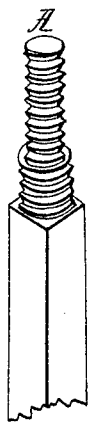
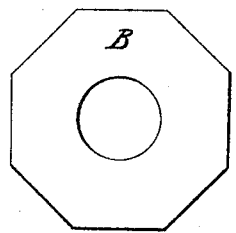
Witnesses:
F. A. Wilson
Charles P. Stetson
Inventor:
James Tracy

UNITED STATES PATENT OFFICE.

JAMES TRACY, OF BREWER, MAINE.

IMPROVEMENT IN SAW-MILLS.

Specification forming part of Letters Patent No. 51,244, dated November 28, 1865.

*To all whom it may concern:*

Be it known that I, JAMES TRACY, of Brewer, in the county of Penobscot, State of Maine, have invented a new and useful machine, the same being an Improved Gage and Gage-Bar for Hanging Gang-Saws; and I do hereby declare that the following is a full, clear, and exact description of the construction and operation of the same, reference being had to the annexed drawings, making a part of this specification, in which—

Figure 1 is a perspective view of the gage-bar with gages and nuts. Fig. A is a perspective view of one end of the gage-bar, showing male screws of different diameters. Fig. B is a plan of one of the screw nuts or burrs which revolve on the male screws on the end of the gage-bar A. Fig. C is a plan of the screw nut or burr which revolves on the larger screw on the gage-bar A. Fig. D is a plan of a collar or washer which slides on the gage-bar A, and which collar I term a "gage." The gains in the gage, as marked in Fig. D, and more fully shown in Fig. 1, receive the edge of the saw. Fig. E is a tight collar permanently fixed upon the gage-bar.

The gage-bar may be either round or square, and the gages may be either circular or plane-sided disks, and of any desired thickness. All parts are to be of iron or steel or other metal.

In operation, the gages, of thicknesses varying with the distance at which the saws are designed to hang in the gang, are pushed upon the gage-bar up to the tight collar E and fastened firmly by the burr or nut C. The gage-bars, with the gages so adjusted, are then placed in the gage-holder at the head and foot of the saws, with the collar E firm against the gage-holder, where they are fastened by the use of the burrs or nuts B. The edges of the saws in the gang are placed in the gains in the gages, the thickness of which regulates the distance which separates the saws.

I claim—

The improved gage as not only having its movable gages D made with gains, as represented, for receiving and holding the saws, but as furnished with the stationary collar E and the nuts C B B B and their separate screws, arranged as specified.

JAMES TRACY.

Witnesses:
F. A. WILSON,
CHAS. P. STETSON.